(Model.)
2 Sheets—Sheet 1.
J. E. WENGER.
MACHINE FOR DIPPING ANIMALS.
No. 412,815. Patented Oct. 15, 1889.
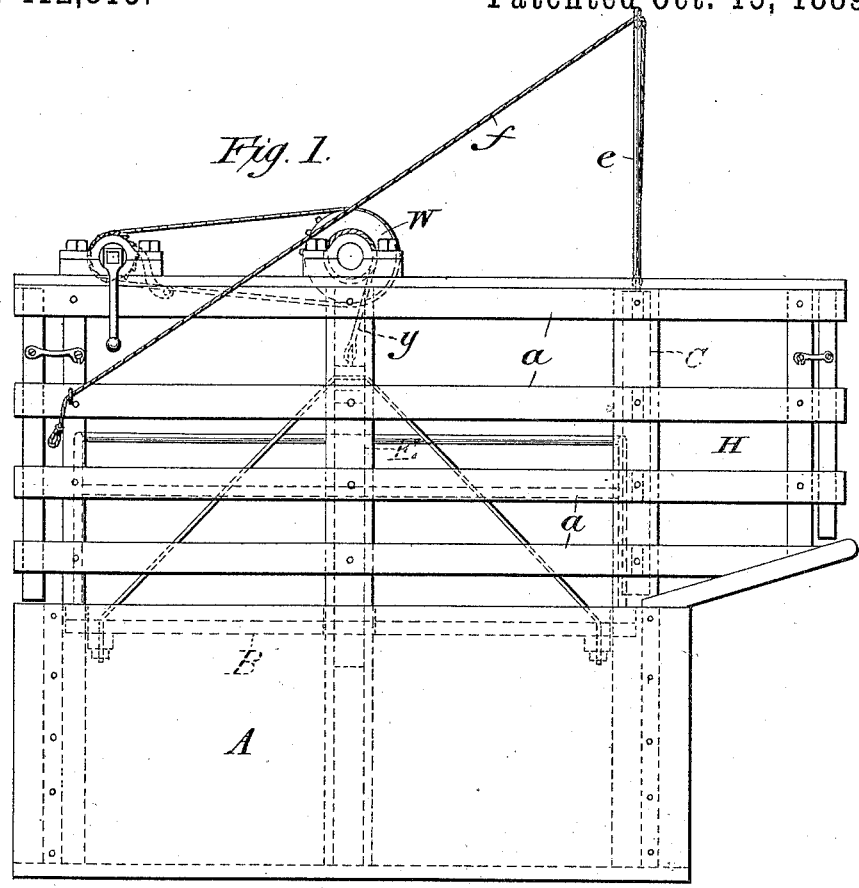
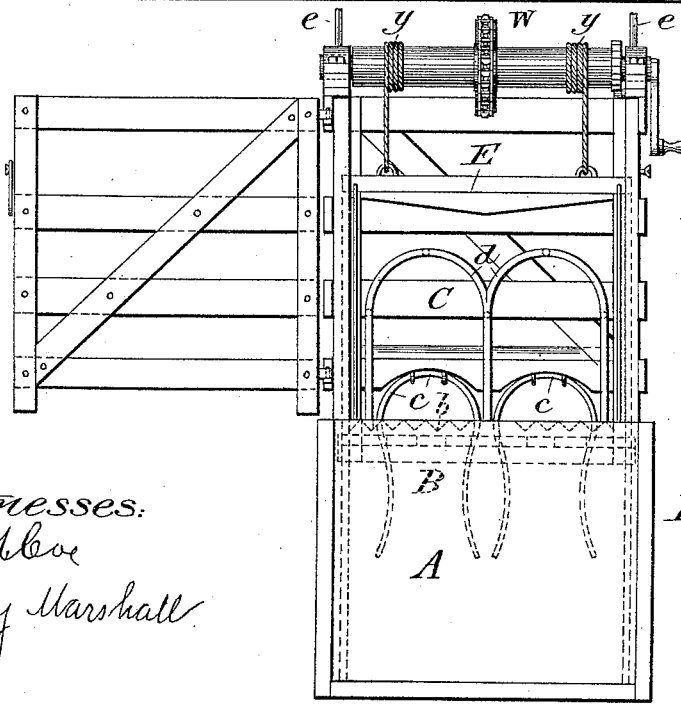
Witnesses:
S. N. Coe
Henry Marshall
Inventor:
Jacob E. Wenger
Per H. B. Swartz
Atty.

(Model.) 2 Sheets—Sheet 2.

J. E. WENGER.
MACHINE FOR DIPPING ANIMALS.

No. 412,815. Patented Oct. 15, 1889.

Witnesses:
S. N. Coe
Henry Marshall

Inventor
Jacob E. Wenger
per H. B. Swartz
Atty.

UNITED STATES PATENT OFFICE.

JACOB E. WENGER, OF BURTON CITY, OHIO.

MACHINE FOR DIPPING ANIMALS.

SPECIFICATION forming part of Letters Patent No. 412,815, dated October 15, 1889.

Application filed April 3, 1889. Serial No. 305,624. (Model.)

*To all whom it may concern:*

Be it known that I, JACOB E. WENGER, a citizen of the United States, residing at Burton City, in the county of Wayne and State of Ohio, have invented a new and useful Machine for Dipping Animals, of which the following is a specification.

My invention relates to devices for bathing unclean or diseased animals, and more especially sheep. Its object is to provide a ready means for washing and bathing such animals in water, either cold or warm, or medicated, or in liquid medicine of any kind, as necessity may require, for the purpose of removing filth, vermin, and the like, and to administer healing remedies in cases of foot-rot, scab, or other cutaneous disease of any kind without worrying or causing any struggle on the part of the animal in the operation. I accomplish this by providing a tank of suitable dimensions to contain the bath, a vertically-movable platform therein, and suitable mechanism for elevating or lowering the platform at will, whereby the animal is either partially or wholly immersed in the bath, together with suitable attachments for securing the animal upon the platform, and partially drying the fleece after the bath.

My invention is illustrated by the accompanying drawings, in which similar letters of reference indicate like parts.

Figure 3:
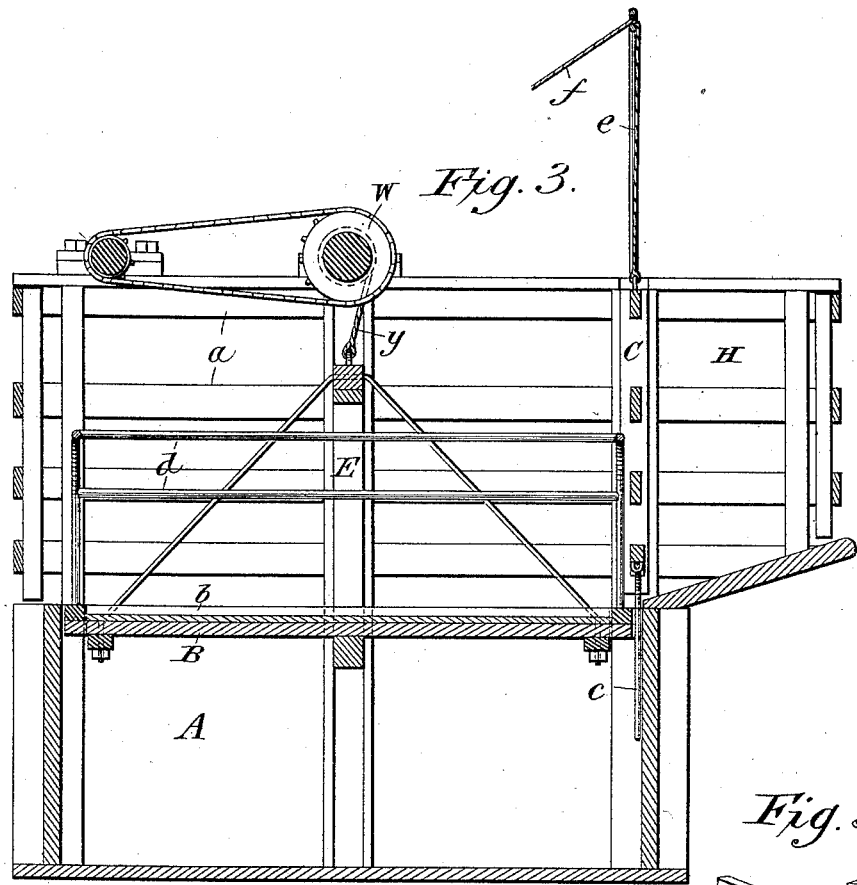
Figures 4, 5:
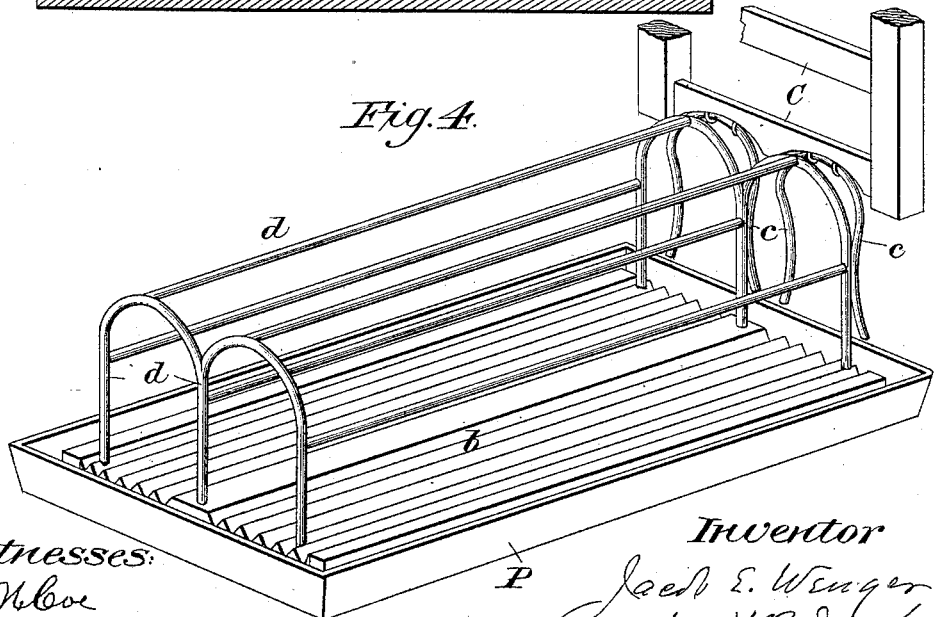

Figure 1 is a side view of the device embodying my invention. Fig. 2 is an end view of the same. Fig. 3 is a sectional view of the same, cut vertically through its longitudinal center. Fig. 4 is a detached view of the upper surface of the platform and devices for confining the animal thereon. Fig. 5 is a section of the lower part of end gate and spring-arms thereon for pressing the liquid out of the fleece.

Referring to the drawings, A is the bath-tank. It is surmounted by a frame of slat-work to confine the animal upon the platform B. This platform is vertically movable at the operator's will by means of the crank and chain connected windlass $w$, from which axle ropes $y$ descend to a central frame E, which secures the platform upon each side within vertical slides and along grooves therein, whereby the platform is sustained horizontally at any desired elevation or depression.

C is an end gate of the slat frame, which opens vertically, being drawn up by a cord $f$ passing through an eye at the upper end of the support-bar $e$. At the lower end of this gate are secured downwardly-projecting springs $c$, used in connection with the metal frame $d$, attached upon the platform, Fig. 4. If desired, a metal pan P may be used upon the platform to hold shallow solutions of medicine, instead of using the entire tank. This I use especially in cases of foot-rot and the like. The sheep enter the open end of the slat frame above the tank and into the metal frame $d$, which prevents them from jumping about. After the bath the end gate $c$ is raised, to allow the sheep to pass under it and between the downwardly-projecting spring-arms $c$, the weight of the gate and the compression of the spring-arms upon the sheep as it passes off the platform sweep off the surplus liquid from its fleece into the tank. An outer apartment H may also be provided as a dripping-place.

Having thus described my invention, what I claim is—

1. In a machine for dipping animals, the combination, with a tank, of a platform and suitable raising and lowering mechanism, and a supplemental platform provided with grooves, as and for the purpose set forth.

2. In a machine for dipping animals, the combination, with a vertically-adjustable platform B, of the frame $d$, mounted thereon, such frame consisting of suitable uprights rounded on their upper ends and connected by longitudinal bars, as and for the purpose set forth.

3. The combination, with the platform B, of the metal frame $d$ and the vertically-movable gate C, provided with downwardly-projecting spring-arms $c$, substantially as and for the purpose specified.

In testimony whereof I hereunto set my hand, this 9th day of October, A. D. 1888, in presence of two witnesses.

JACOB E. WENGER.

Witnesses:
HIRAM B. SWARTZ,
T. E. PECKINPAUGH.